United States Patent Office 3,214,833
Patented Nov. 2, 1965

3,214,833
CERAMIC TO METAL BONDING PROCESS
George F. Erickson, Los Alamos, N. Mex., assignor to the United States of America as represented by the United States Atomic Energy Commission
No Drawing. Filed Sept. 25, 1962, Ser. No. 226,779
5 Claims. (Cl. 29—473.1)

This invention relates to metal coated ceramic materials and, more particularly, to a method of producing a novel article which comprises a tantalum or niobium coating over a beryllia body.

In this process an interface metallic foil of titanium or zirconium is placed over the beryllia body with tantalum niobium placed on the other side of the interface foil. The stacked arrangement is heated to a temperature below the melting point of the interface metal foil for a few minutes. Upon cooling, the novel article of the invention is obtained.

This article is comprised of materials which have very advantageous physical properties. Beryllia's coefficient of expansion is comparable with the metals titanium, niobium, tantalum and zirconium. Therefore, the likelihood of the bond cracking from a differential in thermal expansion is considerably reduced over that of metal coated ceramics in use at present. Furthermore the ceramic has good electrical resistivity, can stand extreme thermal shock, has a high thermal conductivity, good nuclear properties and mechanical strength. These physical properties enable the coated ceramic article to be employed in a variety of useful applications. One such application is for use as an insulator assembly in a plasma thermocouple. For example, niobium, beryllia, and the interface materials possess the useful property of having low neutron absorption cross section. The use of such an insulator assembly in a plasma thermocouple therefore results in little loss of neutrons from the system. The assembly can also be used in the modern transmitting-receiving tubes. The article is capable of operation at high temperatures and less outgassing is found than in comparable tubes utilizing glass. Another useful application would be for connections between beryllia, having a high thermal conductivity, and a metal of the aforementioned class in combustion tubes of jets and rockets. When beryllia is used as a moderator in nuclear reactors, it may be desired to isolate it from the coolant by coating with a low neutron absorption metal of the class mentioned above.

These novel articles are very advantageous in such applications. For example, relatively thick joints may be used which are very strong and, since the thermal expansion coefficients are comparable, are relatively difficult to crack in high temperature operation.

Prior to this invention designers had to be content with less advantageous assemblies. For example, silver, copper or a eutectic of these have been used to form a bond with a ceramic material such as alumina. The process of producing these prior art assemblies often requires some type of treatment of the ceramic before the foil can be joined to it. This treatment might consist of applying a coating of molybdenum-manganese powder to the surface of the ceramic and then firing it in hydrogen. Moreover, silver, copper or a eutectic of these has a relatively low melting point and its use is, consequently, limited in high temperature applications.

It is, therefore, an object of this invention to provide a method of producing a beryllia ceramic coated with a metal of the class consisting of tantalum or niobium.

It is another object of this invention to provide a bonded ceramic material which will be highly useful in high temperature and nuclear applications.

It is a further object of this invention to provide a relatively simple method of producing a bonded ceramic possessing the advantageous properties set forth above.

Further objects and advantages of this invention will be apparent from the detailed description set forth below. For example, modern electronic applications often require alternating layers of ceramic and metal. This may be easily obtained in the practice of this invention by the simple expedient of adding further layers before firing.

The novel method of this invention takes advantage of the ability of titanium or zirconium to react with beryllia to form a lower melting point alloy which wets all surfaces at the interface. Since zirconium and titanium are strong reducing agents, beryllia at the interface is reduced to the beryllium metal. The melting point of titanium has been variously reported at between 1660° C. and 1720° C. and that of zirconium about 1860° C. However, a titanium-beryllium eutectic is obtained at about 2 weight percent beryllium and this eutectic melts at about 1300° C. The beryllium-zirconium eutectic obtained at about 5 weight percent beryllium melts at approximately 1000° C.

The method of this invention is practiced on a good vacuum type grade beryllia which may be obtained from a number of commercial sources. Tantalum or niobium is joined to such a beryllia article by using an interface foil of either titanium or zirconium. The thickness of such a foil may be between about 3 to about 10 mils thickness. The lower limit of this thickness is dependent upon the fitup of materials, which in turn depends upon the surface qualities of the materials. Of course the foil may be any alloy of titanium and zirconium. A particularly advantageous alloy would be the eutectic mixture. This stacked arrangement of beryllia, a foil of zirconium, titanium, or both, and lastly the tantalum or niobium to be joined, is heated in a high vacuum (desirably a greater vacuum than $10^{-5}$ atmospheres) to about 50 to 75° C. below the melting point of the interface metal foil. The time at which such a temperature is maintained depends upon the particular temperature used. The closer this temperature is to the melting point, the less time is required and the lower the temperature is, compared to the melting point, the longer the time required. It has been found that 5 minutes is a suitable time for the temperature range described above. It has also been found that a total of 10 minutes from room temperature to the desired temperature is a suitable rate of heating for small structures. Upon cooling in vacuum the assembly is in its complete form. It has been found that a useful technique in cooling is to quickly lower the temperature to below the freezing point of the interface material after this material has been observed to soften. The article may then be cooled as rapidly as the joint will allow. A very pure inert gas (e.g., helium) may be used in place of a high vacuum but, owing to the difficulties of obtaining such a pure inert atmosphere, it is preferable to use the vacuum technique. A pressure greater than $10^{-5}$ atmospheres may be used but a pressure less than this value has been found desirable since there is a markedly reduced danger of oxidation of the metals involved.

The resulting article is useful in high temperature applications to about 900° C. although it is cautioned that this excludes an atmosphere such as air and should be restricted to vacuum or an inert atmosphere. This novel article, as shown above, is relatively simple to produce and possesses many physical advantages over the bonded ceramics heretofore used.

What is claimed is:
1. A process for bonding beryllia ceramic to a refractory metal selected from the class consisting of tantalum and niobium, comprising inserting an interface foil consisting of titanium, of between about 3 to 10 mils thickness between the beryllia ceramic and the said refractory metal, heating this stacked arrangement in a vacuum to a temperature between about 50–75° C. below the melting point of said interface foil and cooling the bonded article.

2. A process as in claim 1 wherein the pressure is less than about $10^{-5}$ atmospheres.

3. A process as described in claim 1 wherein a pure inert gas atmosphere is used in place of a vacuum.

4. A process as described in claim 1 wherein the refractory metal is niobium.

5. A process as described in claim 1 wherein the refractory metal is tantalum.

References Cited by the Examiner

UNITED STATES PATENTS

| 2,857,663 | 10/58 | Beggs | 29—473.1 |
| 2,859,512 | 11/58 | Dijksterhuis | 29—473.1 |
| 2,916,810 | 12/59 | Smith | 29—195 |
| 2,971,251 | 2/61 | Willemse | 29—195 |

OTHER REFERENCES

Constitution of Binary Alloys, by Hansen, pages 1023 and 1221.

JOHN F. CAMPBELL, *Primary Examiner.*

HYLAND BIZOT, *Examiner.*